United States Patent Office 3,226,357
Patented Dec. 28, 1965

3,226,357
POLYOLEFINS STABILIZED WITH DERIVATIVES OF XYLYLENE THIOETHERS
Harry Braus, Springdale, and Fred D. Waas, Cincinnati, Ohio, assignors to National Distillers and Chemical Corporation, New York, N.Y., a corporation of Virginia
No Drawing. Filed Sept. 11, 1962, Ser. No. 222,943
2 Claims. (Cl. 260—45.85)

This invention relates to new compositions of matter and particularly to new compositions of matter comprising polymers of aliphatic olefins stabilized against molecular degradation using certain xylylene thioether derivatives.

Polymers of aliphatic olefins, such as for example polyethylene and polypropylene, have numerous valuable properties which permit them to be used in the manufacture of pipe, film, wire, coating or various molded objects such as bottles and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use. The molecular breakdown which occurs in these polymers during fabrication is evidenced by a substantial increase in the melt flow rate and in the color of the polymer.

It is an object of this invention to provide a method of stabilizing polymers of aliphatic olefins against thermal and mechanical degradation. Another object is to provide a stabilized polymer of such olefins which can be processed under conditions of elevated temperature and mechanical working without substantial increase in the melt flow rate, and without significant color changes. Still another object is to provide compositions comprising as a major component, polymers of aliphatic olefins, and as a minor component one or more xylylene thioether derivatives, alone, or together with other known stabilizers for polymers of such olefins. Other objects will appear hereinafter.

It has been discovered that polymers of aliphatic olefins can be stabilized against degradation by incorporating into the polymer xylylene thioether derivatives having the following structure:

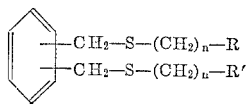

wherein $n$ is an integer from 1 to 4, and R and R' are selected from the group consisting of —O—CO—R'' and —CO—OR'', wherein R'' is an aliphatic radical having from 10 to 22 carbon atoms. Although R and R' can be different, it is generally preferred that they be the same.

The polymers to which the invention applies are the normally solid polymers of aliphatic olefins having from 2 to 6 carbon atoms per molecule such as polymers of ethylene, propylene, 1-butene, isobutylene, 2-butene, 1-pentene and 1-hexene and copolymers thereof. Of special importance among these is polypropylene.

These stabilizing compounds may be mixed with the polyolefin in any suitable manner that will effect thorough distribution and dispersion. This can be accomplished in a machine suitable for mixing solids, as by milling the polyolefin polymer with the addition agent on heated rolls, such as are used in the compounding of rubber, or on other suitable milling or mixing equipment, such as, for example, a Banbury mixer or other rubber mill. Instead of adding the agent to the polymer in the solid or molten state, it can be added to a solution or suspension of polymer in an organic solvent or to an aqueous dispersion thereof and the volatile solvent subsequently removed by vaporization.

In general, the amount of agent to be added to the polyolefin depends upon the degree and kind of stabilization desired. The amount of agent added can vary from 0.001% to 5.0% based on the weight of the polyolefin polymer, but as a rule it is preferred to use the minimum amount required to achieve the desired results. The preferred amount used will ordinarily vary from 0.05 to 0.5 part by weight per hundred parts by weight of polyolefin.

The above defined compounds may be used in combinations with other stabilizers, and in particular those of the hindered bis-phenol type such as Cyanamid 2246 which is a derivative of 2,2'-dihydroxydiphenylmethane; allegedly it is 2,2'-methylene-bis (4-methyl-6-tertiarybutyl-phenol). The novel stabilizers of this invention may also be used in combination with other stabilizers of the hindered bisphenol type such as Cyanamid 162 which is 2,2'-methylene-bis (4-ethyl-6-tertiarybutyl-phenol); Antioxidant 712 which is 4,4'-bis(2,6-di-tertiarybutyl-phenol); or Antioxidant 762 which is 2,6-di-tertiarybutyl-α-methoxy-p-cresol.

There are certain practical commercial advantages that frequently accompany the use of such combinations of stabilizers, as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer, and still be able to obtain good stabilization.

In one preferred embodiment of the invention R and R' in the above formula contain the ester grouping —O—CO—R''. These compounds may be prepared, for example, by treating a mercaptoalkanol having from 1 to 4 carbon atoms, such as 2-mercaptoethanol, with sodium to form the sodium mercaptide, which is then reacted with one or a mixture of xylylene dichlorides to form the corresponding α,α'-bis(hydroxyalkylthio)xylene which has the following generic formula:

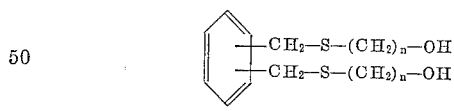

wherein $n$ is an integer from about 1 to 4.

The above compound is then esterified in any known manner. The diester may be obtained, for example, using approximately two equivalents of the desired fatty acid, by well known esterification reactions. The monoesters are prepared by a similar procedure using about a onefold excess of the glycol. The esters have the formula

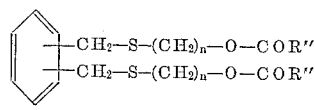

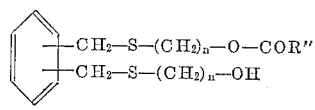

In analogous manner the mono- and di-fatty acid esters may be prepared from a saturated fatty acid having from 10 to 22 carbon atoms. Examples of such esters include the monolaurate, the dilaurate, the monostearate, distearate, and analogous compounds derived from other fatty acids such as capric, myristic, palmitic, arachidic and the like.

In another embodiment of the invention R and R' in the above formula which defines the invention contain the ester group —CO—O—R''. These compounds may be prepared directly from a mercaptoalkanoic acid ester and an α,α'-dihalo-xylene. For example, lauryl B-mercapto-propionate is treated with sodium ethoxide to form the corresponding sodium mercaptide, which is then reacted with α,α'-dichloro-p-xylene to form the α,α'-bis-(lauryl B-thiopropionate)-p-xylene. In place of an ester of B-mercaptopropionate, an ester of mercaptoacetic acid or mercaptobutyric acid may also be used. Similarly, in place of the lauryl ester, fatty acid esters of other fatty acids obtained from a saturated fatty acid having from 10 to 22 carbon atoms, for example, palmityl, stearyl, and the like may be used. The esters have the formula:

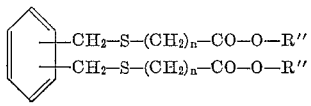

wherein $n$ is an integer from 1 to 4.

The following examples are presented to be illustrative only and are in no way intended to limit the invention specifically thereto.

*Example I*

To a one liter 2-necked indented flask equipped with a stirrer, condenser, and a dropping funnel was added 450 ml. of absolute ethanol. 23 g. of sodium was dissolved in the alcohol. The solution was cooled and 78 g. of 2-mercapto-ethanol was carefully added. The solution was heated to reflux, cooled somewhat, and 90.9 g. of α,α'-dichloro-p-xylene added dropwise. The reaction mixture was heated under reflux for one hour. A Dean-Stark trap was then inserted between the flask and condenser and 350 ml. of ethanol was collected. The residue was cooled and the precipitated sodium chloride was filtered and washed several times with small portions of ethanol. The ethanolic solution was evaporated on the steam bath to yield the crude product. Purification was accomplished by Soxhlet extraction of the crude product with ether and crystallization from the ether at 0° C. to obtain the α,α'-bis(hydroxyethylthio)-p-xylene. Sulfur: Calc'd, 24.81%: Found, 24.6%.

*Example II*

A mixture of 40.0 g. of lauric acid and 25.8 g. of α,α'-bis(hydroxyethylthio)-p-xylene was heated at 170–200° C. for 6 hours during which time 3 ml. of water was collected. The reaction mixture was taken up in 100 ml. of benzene, washed with water, 5% sodium hydroxide solution and again with water. The organic layer was separated and filtered. The benzene was evaporated and the residue recrystallized from 300 ml. of hexane to yield the dilauryl ester. Sulfur: Calc'd, 10.28%. Found 10.2%. This compound functioned effectively as a stabilizer when incorporated into polypropylene.

*Example III*

Into a dry, 1000 ml. round-bottom 3-necked flask fitted with a stirrer, thermometer, dropping funnel and condenser protected by a $CaCl_2$ tube, was placed 343 ml. of absolute alcohol and 17.6 g. of sodium. When solution was complete the mixture was cooled to 10° C. and 209 g. of lauryl-B-mercaptopropionate was added slowly. The temperature was maintained between 10–15° C. After one-half hour of stirring 66.75 g. of α,α'-dichloro-p-xylene dissolved in 100 ml. of dry benzene was added dropwise. The temperature was maintained below 50° C. during the addition. When the addition was complete the reaction mixture was refluxed for 1½ hours.

The cooled reaction mixture was filtered to remove the salt and the benzene and alcohol removed by evaporation. The residue was dissolved in ether, filtered and the ether removed by distillation. A residue remained which was crystalline and had a melting point of 21° C. It was the α,α'-bis(lauryl B-thiopropionate)-p-xylene.

*Example IV*

The thermal and oxidative breakdown are determined by measuring the change in flow rate (ASTM D–1238–57T 2160 g. load; 190° C. for polyethylene and 230° F. for polypropylene), and by observing the color change upon extended milling at 350° C. The samples for testing are prepared in the following manner:

A sample of polypropylene (0.905 g./ml. density, 5.9 g./10 min. flow rate at 230° C.) free of stabilizers and in the form of a 10 mesh powder, and the desired quantity of stabilizer as a 1% solution in benzene or acetone are charged to a Hobart mixer. The mixer is allowed to stir until all of the solvent has evaporated. A 400 gram aliquot of the resultant composition is then milled on a two-roll, differential speed, rubber mill at 350° F. Starting from the time at which all of the polymer has melted and banded, 30 gram samples of polymer are removed at 5, 10, 20, 30, 45 and 60 minute intervals.

Portions of each such sample are used for a determination of melt flow rate, and for the preparation of a pressed 1 inch by 1 inch by 50 mil sheet for mounting on white cardboard for color comparison.

Tests of the thermal and oxidative breakdown of polypropylene containing the above stabilizer are shown in Table I below.

TABLE I

| Stabilizer | Concentration weight percent polymer [1] | Milling time, minutes at 330–340° F. | Melt flow rate | | Final color |
|---|---|---|---|---|---|
| | | | Initial | Final | |
| None | 0 | 0 | 0.5 | | White, no haze |
| α,α'-bis-(lauryl B-thiopropionate)-p-xylene. | 0 | 10 | | 4.66 | |
| | 0 | 20 | | 15.6 | Gray. |
| | 0.5 | 60 | 0.5 | 2.03 | White, no haze |

[1] Profax 6501 (unstabilized polypropylene).

In the above table the reference standard for determining improvement is the polymer blank without stabilizer. The sample stabilized with α,α'-bis(lauryl B-thiopropionate)-p-xylene shows significant improvement in both mill stability and color over the blank when degraded for 60 minutes under the test conditions.

As will be evident to those skilled in the art, various modifications of this invention can be made or followed in the light of the foregoing disclosure and discussion without departing from the spirit or scope thereof.

What is claimed is:

1. A polymer of aliphatic monoolefin having from 2 to 6 carbon atoms per molecule stabilized against molecular degradation under conditions of elevated temperature and mechanical working with from 0.001 to 5.0 parts by weight per 100 parts of polymers of a compound having the formula:

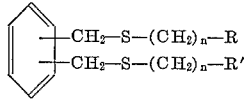

wherein $n$ is an integer from 1 to 4, and R and R' are the same and are selected from the group consisting of —O—CO—R″ and —COOR″, wherein R″ is an aliphatic radical having from 10 to 22 carbon atoms.

2. A polypropylene polymer stabilized with 0.05 to 0.5 part by weight per 100 parts of polymer of $\alpha,\alpha'$-bis(lauryl B-thiopropionate)-p-xylene.

References Cited by the Examiner

UNITED STATES PATENTS

| | | | |
|---|---|---|---|
| 2,519,755 | 8/1950 | Gribbins | 260—45.85 |
| 2,972,597 | 2/1961 | Newland et al. | 260—45.85 |
| 2,981,717 | 4/1961 | Boultbee | 260—45.85 |
| 3,098,078 | 7/1963 | Druey et al. | 260—470 |
| 3,116,305 | 12/1963 | Morris et al. | 260—410.5 |
| 3,117,104 | 1/1964 | Brown et al. | 260—45.85 |
| 3,144,422 | 9/1964 | Homberg | 260—45.85 |

LEON J. BERCOVITZ, *Primary Examiner.*

R. A. WHITE, *Assistant Examiner.*